(12) United States Patent
Rudinec

(10) Patent No.: US 9,170,081 B2
(45) Date of Patent: Oct. 27, 2015

(54) ALL-ELECTRIC POWERED ANFO VEHICLE

(75) Inventor: Stephen A. Rudinec, Iron Mountain, MI (US)

(73) Assignee: Oldenburg Group Incorporated, Glendale, WI (US)

( * ) Notice: Subject to any disclaimer, the term of this patent is extended or adjusted under 35 U.S.C. 154(b) by 145 days.

(21) Appl. No.: 13/403,263

(22) Filed: Feb. 23, 2012

(65) Prior Publication Data

US 2013/0220714 A1    Aug. 29, 2013

(51) Int. Cl.
| | |
|---|---|
| *F42D 1/10* | (2006.01) |
| *B60L 1/00* | (2006.01) |
| *B60L 7/14* | (2006.01) |
| *B60L 11/18* | (2006.01) |

(52) U.S. Cl.
CPC . *F42D 1/10* (2013.01); *B60L 1/003* (2013.01); *B60L 7/14* (2013.01); *B60L 11/1803* (2013.01); *B60L 11/1822* (2013.01); *B60L 11/1877* (2013.01); *B60L 2200/26* (2013.01); *B60L 2200/40* (2013.01); *B60L 2210/30* (2013.01); *B60L 2210/40* (2013.01); *B60L 2250/16* (2013.01); *Y02T 10/7005* (2013.01); *Y02T 10/705* (2013.01); *Y02T 10/7072* (2013.01); *Y02T 10/7241* (2013.01); *Y02T 90/124* (2013.01); *Y02T 90/127* (2013.01); *Y02T 90/14* (2013.01)

(58) Field of Classification Search
CPC ........... B60L 1/003; B60L 1/00; B60L 11/00; B60L 11/1803; B60L 11/18; B60L 11/1822; B60L 11/1877; B60L 2200/40; B60L 2200/36; B60L 2210/40; F42D 1/10; F42D 1/00; F42D 1/08

USPC ........ 206/3; 180/65.1, 305, 65.29, 54.1, 68.5, 180/271, 290, 21, 22, 233, 14.1, 14.2, 14.3; 280/400, 420, 421, 830, 831, 832, 834, 280/837, 838, 839; 254/418–425
See application file for complete search history.

(56) References Cited

U.S. PATENT DOCUMENTS

| | | | | |
|---|---|---|---|---|
| 3,303,738 | A | * | 2/1967 | Clay et al. .................... 86/20.15 |
| 3,336,997 | A | | 8/1967 | Yates et al. |
| 3,768,574 | A | * | 10/1973 | Long .............................. 173/189 |
| 3,877,717 | A | * | 4/1975 | Swoager ................. 280/124.134 |
| 3,937,345 | A | * | 2/1976 | Countryman ................. 414/492 |

(Continued)

FOREIGN PATENT DOCUMENTS

| | | |
|---|---|---|
| JP | H07218199 | 8/1995 |
| JP | H0886600 | 4/1996 |
| JP | 2012017952 | 1/2012 |

*Primary Examiner* — James M Dolak
(74) *Attorney, Agent, or Firm* — Reinhart Boerner Van Deuren s.c.

(57) ABSTRACT

There is provided an all-electric powered ANFO vehicle. The all-electric powered ANFO vehicle includes a support structure. This support structure includes a first and second section and a steering section. The support structure also includes a lift apparatus configured to deliver explosives to a mine face in a mine tunnel. A self-contained battery module is removably mounted on the support structure. A pair of wheel sets is coupled to the support structure, with each wheel set including two wheels. One wheel of each wheel set is rotably coupled on each side of the support structure. A motor is mounted on the support structure and is coupled to at least one wheel and the battery module. A motor controller, including a DC/AC inverter is coupled to the motor and the battery module.

20 Claims, 6 Drawing Sheets

(56) References Cited

U.S. PATENT DOCUMENTS

| | | | |
|---|---|---|---|
| 3,951,215 A * | 4/1976 | Galis | 173/189 |
| 4,137,984 A * | 2/1979 | Jennings et al. | 180/19.1 |
| 4,195,548 A * | 4/1980 | Cook et al. | 86/1.1 |
| 4,223,758 A * | 9/1980 | Schopf | 180/291 |
| 4,245,714 A * | 1/1981 | Kersey | 180/265 |
| 4,290,490 A * | 9/1981 | Barthe et al. | 173/189 |
| 4,320,814 A | 3/1982 | Middelhoven | |
| 4,415,051 A | 11/1983 | Taylor | |
| 4,434,864 A * | 3/1984 | Lupo | 180/6.2 |
| 4,685,375 A * | 8/1987 | Ross et al. | 86/20.15 |
| 4,723,733 A * | 2/1988 | McClinchy | 244/134 C |
| 5,033,567 A * | 7/1991 | Washburn et al. | 180/89.12 |
| 5,082,082 A * | 1/1992 | Hvolka | 180/234 |
| 5,156,230 A * | 10/1992 | Washburn | 180/170 |
| 5,163,537 A | 11/1992 | Radev | |
| D334,547 S * | 4/1993 | Vestergaard | D12/14 |
| 5,285,866 A | 2/1994 | Ackroyd | |
| 5,293,947 A * | 3/1994 | Stratton | 180/2.1 |
| 5,358,058 A | 10/1994 | Edlund et al. | |
| 5,465,798 A | 11/1995 | Edlund et al. | |
| 5,951,208 A * | 9/1999 | Wilson et al. | 405/259.6 |
| 6,409,457 B1 * | 6/2002 | Korycan et al. | 414/501 |
| 6,962,050 B2 | 11/2005 | Hiraki et al. | |
| 7,053,568 B2 * | 5/2006 | Rudinec | 318/139 |
| 7,379,797 B2 | 5/2008 | Nasr et al. | |
| 7,443,083 B2 | 10/2008 | Genis et al. | |
| 7,770,673 B2 * | 8/2010 | Allen et al. | 180/65.1 |
| 7,971,534 B2 * | 7/2011 | Waldock | 102/313 |
| 8,261,664 B2 * | 9/2012 | Von Lengeling et al. | 102/313 |
| 8,342,267 B1 * | 1/2013 | Hinshaw et al. | 175/86 |
| 8,550,007 B2 * | 10/2013 | Mazumdar et al. | 104/289 |
| 8,714,286 B2 * | 5/2014 | Kouvo et al. | 180/2.1 |
| 8,833,505 B2 * | 9/2014 | Makisalo et al. | 180/419 |
| 8,869,923 B2 * | 10/2014 | Osara et al. | 180/65.1 |
| 8,950,330 B2 * | 2/2015 | Waldock | 102/313 |
| 8,950,530 B2 * | 2/2015 | Niedzwiecki | 180/65.31 |
| 8,955,657 B2 * | 2/2015 | Osara et al. | 191/3 |
| 8,972,084 B2 * | 3/2015 | Bissontz | 701/22 |
| 8,978,800 B2 * | 3/2015 | Soma' et al. | 180/65.22 |
| 8,991,528 B2 * | 3/2015 | Hellholm et al. | 180/14.2 |
| 2003/0205421 A1 | 11/2003 | Allen et al. | |
| 2004/0134694 A1 * | 7/2004 | Allen et al. | 180/65.1 |
| 2009/0107749 A1 * | 4/2009 | Clark et al. | 180/197 |
| 2011/0260439 A1 | 10/2011 | Waldock | |
| 2012/0024181 A1 | 2/2012 | Von Lengeling et al. | |

* cited by examiner

ALL-ELECTRIC POWERED ANFO VEHICLE

BACKGROUND OF THE INVENTION

Field of the Invention

The present disclosure related generally to vehicles, particularly all-electric powered Ammonium Nitrate and Fuel Oil (ANFO) vehicles, and more specifically an all-electric powered ANFO vehicle to transport and install explosives for mining and construction environments.

Mining payloads typically are transported through tunnels of underground mines either by a railway train, including a locomotive and one or more cars operated on a fixed system of railway tracks, or by rigid body, load-carrying trucks. Such articulated and/or rigid body, load-carrying trucks are typically powered by diesel powered generators or diesel engines. However, diesel powered ANFO vehicles are relatively expensive to operate because of fuel costs and managing expulsion of noxious emissions, such as fumes. Consequently, some mine payload hauling vehicles typically are operated by electric power that is supplied to the vehicle via tether cables.

In some other mining vehicles, DC motors are used powered by a battery. However, DC motors, because of their construction and operation are subject to carbon tracking and premature failure.

The vehicle of the present disclosure must also be of construction which is both durable and long lasting. In order to enhance the market appeal of the vehicle of the present disclosure, it should also be of cost effective construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided an all-electric powered ANFO vehicle. The all-electric powered ANFO vehicle includes a support structure having a portion configured as a platform configured to support a container of an explosive component. The support structure is dimensionally configured to operate in an underground mine. That is to say that the width and height of the all-electric powered ANFO vehicle will allow the vehicle to maneuver within a mine facility.

A container is disposed on the platform. The container holds explosive components. In a typical configuration, a second container, holding additional explosive components is also mounted on the platform.

A self-contained battery module is removably mounted on the support structure. The self-container battery module in one embodiment is mounted in the front of the support structure and is coupled to the support structure with an easy changeout system.

A pair of wheel sets is coupled to the support structure, with each wheel set including two wheels. One wheel of each wheel set is rotably coupled on each side of the support structure. An AC induction motor is mounted on the support structure and coupled to at least one wheel and the battery module. A motor controller, including a DC/AC inverter, is coupled to the AC induction motor and the battery module. A vehicle controller is coupled to the motor controller.

A lift apparatus configured to support a human is coupled to the platform and includes conduits in fluid communication with the container. In operation, a mine operator maneuvers in the mine facility while in the lift apparatus and fills the various holes bored in the mine face with the explosive components through the conduits from the containers. In a typical configuration, there are at least two containers of explosive components that are mixed and pumped into the mine face holes through the conduits.

In another embodiment, the all-electric ANFO vehicle has a support structure that includes a first section and a second section with the two sections connected with a steering section configured to move the first section angularly relative to the second section. The steering section may include two hydraulic cylinders with one end of each hydraulic cylinder coupled to a common pivot configured on one of the first section and second section of the support structure.

There is further provided an all-electric powered ANFO vehicle including a support structure having a platform. The support structure is dimensionally configured to move within an underground mine. A container is disposed on the platform. The container holds explosive components. In a typical configuration, a second container, holding additional explosive components is also mounted on the platform. The ANFO vehicle is configured for a controlled disposition of the explosive components in the mine. A self-contained battery module is removably mounted on the front of the support structure. A pair of wheel sets are coupled to the support structure, with each wheel set including two wheels. One wheel of each wheel set is rotably coupled on each side of the support structure. A lift apparatus is configured to support a human with the lift apparatus coupled to the platform. The lift apparatus includes conduits which are in fluid communication with the container supported on the platform. A pair of motors are mounted on the support structure and coupled to the battery module. A motor is operably coupled to each wheel of at least one wheel set. A motor controller, including a DC/AC inverter, is coupled to each motor and to the battery module.

In another embodiment, motors, coupled to each wheel, are one of an electric motor and a hydraulic motor.

There is additionally provided an all-electric powered ANFO vehicle including a support structure having a portion configured as a platform configured to support a container of an explosive component. The support structure is dimensionally configured to operate in an underground mine. The support structure further includes a first section and a second section with the two sections connected with a steering section. The steering section is configured to move the first section angularly relative to the second section. A container is disposed on the platform. The container holds at least one explosive component. In a typical configuration, a second container, holding an additional explosive component is also mounted on the platform.

A self-contained battery module is removably mounted on the support structure. A pair of wheel sets are coupled to the support structure with each wheel set including two wheels. One wheel of each wheel set is rotably coupled on each side of the support structure. A lift apparatus is configured to support a human with the lift apparatus coupled to the platform. The lift platform includes a conduit in fluid communication with the container. A pair of motors are mounted on the support structure and are coupled to the battery module with a motor operably coupled to each wheel of at least one wheel set. A motor controller, including an DC/AC inverter, is coupled to the motor and the battery module. A vehicle controller is coupled to the motor controller.

The vehicle of the present disclosure is of a construction which is both durable and long lasting, and which will require little maintenance to be provided by the user throughout its operating lifetime. The vehicle of the present disclosure is also of cost effective construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

Figure 1:
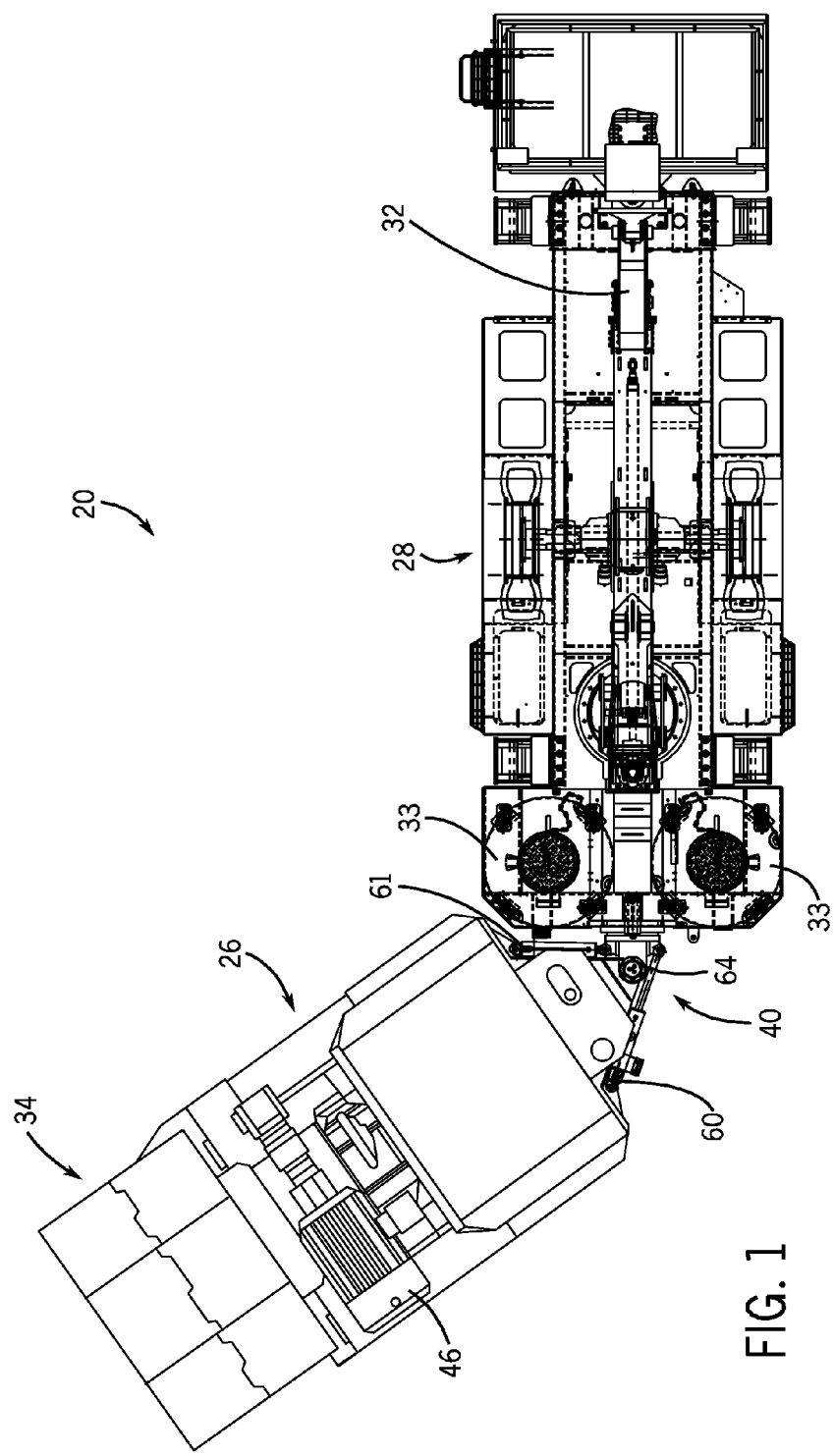
FIG. 1 is a top view of the all-electric powered ANFO vehicle illustrated in FIG. 1.

Referring to the FIGS. 1-7, FIG. 1 is a top view of an exemplary embodiment of an all-electric powered ANFO vehicle 20 that includes a lift apparatus and an apparatus for placing explosive components. The explosive components are transported on the vehicle in containers mounted on the vehicle.

The all-electric powered ANFO vehicle 20 includes a support structure 22 having a portion 30 configured as a tool platform 31. The tool platform 31 is configured to couple with a lift apparatus 32. The lift apparatus 32, for a specific operation. The lift apparatus is coupled to the platform portion 31 of the support structure 22.

Figure 3:
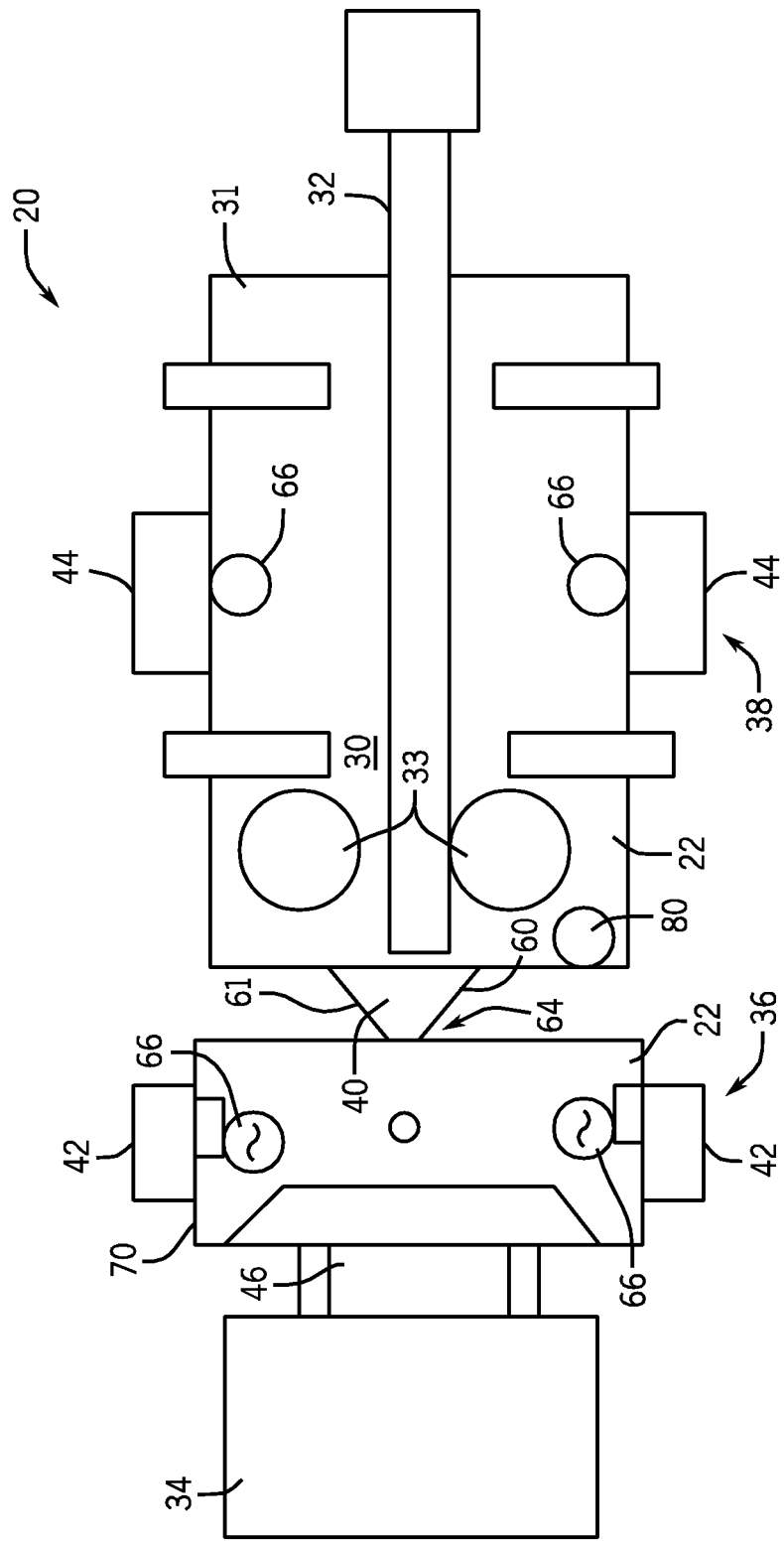
FIG. 3 is a schematic block diagram of an all-electric powered ANFO vehicle including a first and second section support structure and front mounted battery module.

The support structure 22, in one embodiment includes a first section 26 and a second section 28. (See FIG. 1). Maneuvering of the vehicle 20 is performed with a steering section 40 coupled to the first section 26 and second section 28. The steering section 40 includes a first hydraulic cylinder 60 and a second hydraulic cylinder 61. Each cylinder is coupled to one of the first section 26 and second section 28 proximate an outer edge of the section 26, 28. Each cylinder is also coupled to the other of the sections 26, 28 proximate a pivot point 64 on the section. The hydraulic cylinder 60, 61 are coupled to an approximate hydraulic pump and motor. Turning of the vehicle 20 is accomplished by extending one of the hydraulic cylinders and retracting the other hydraulic cylinder. FIG. 1 illustrates the pivot point 64 at the second section 28 of the vehicle, and FIG. 3 illustrates the pivot point 64 at the first section 26 of the vehicle 20.

The figures are illustrations of an all-electric vehicle without some body panels. The support structure 22 includes a pair of side support structures which typically are configured metal channels aligned parallel to each other in a spaced-apart relationship. The side support structures define a front of the vehicle and a back of the vehicle. Various components of the all-electric powered ANFO vehicle 20 are coupled to the support structure 22 such as the battery module 34, a pair of wheel sets 36 and 38 with each wheel set 36, 38 having two wheels 42, 44. In one embodiment, the vehicle front may have a wheel set 36 configured as a steerable wheel set for maneuvering the powered ANFO vehicle 20. It is also contemplated that the other wheel set 38 which typically is in the back of the vehicle can also be steerable in coordination with the front wheel set 36. It should also be understood that additional wheel sets can be coupled to the support structure 22 as determined by the user and/or manufacturer which is dependant on the type of load and the maneuvering capabilities are required for the vehicle 20.

Figure 2:
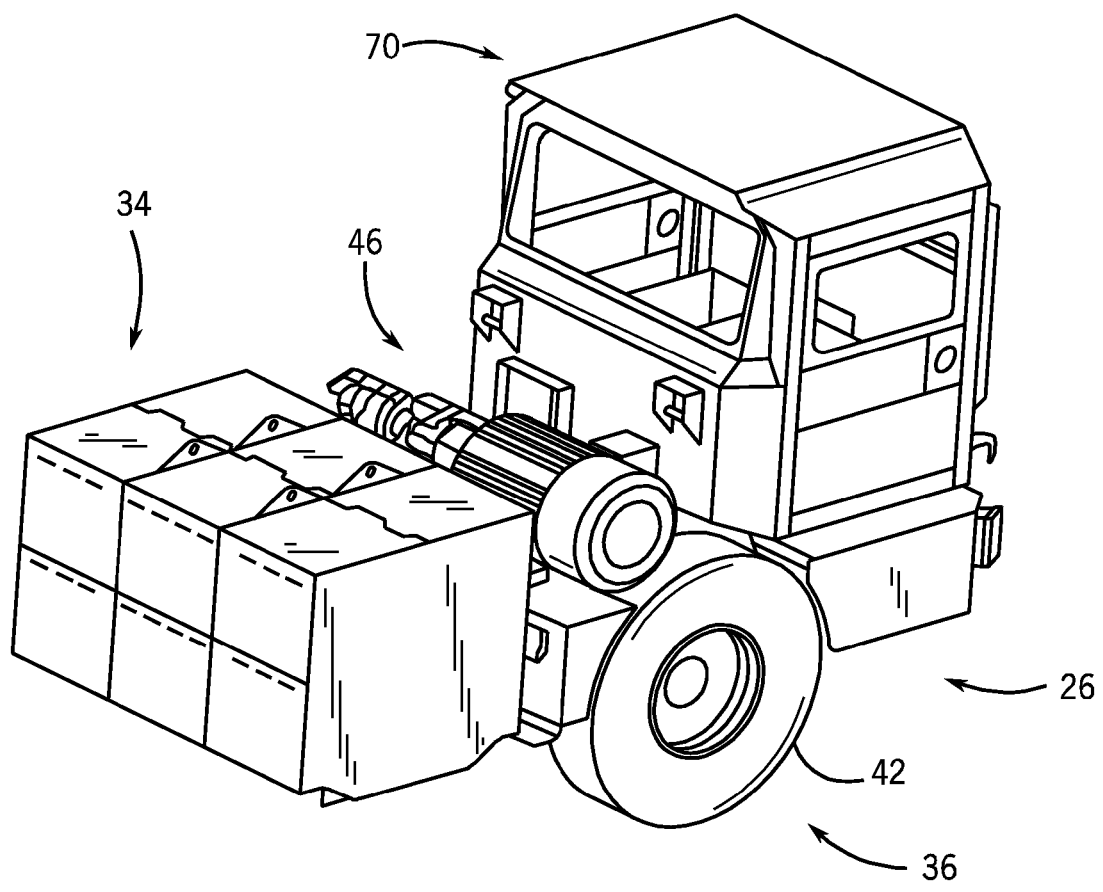
FIG. 2 is a perspective view of a first section of a support platform of the all-electric vehicle power ANFO vehicle illustrated in FIG. 1 with the first section including a self-contained battery module, AC induction motor and a crew cab.
Figure 4:
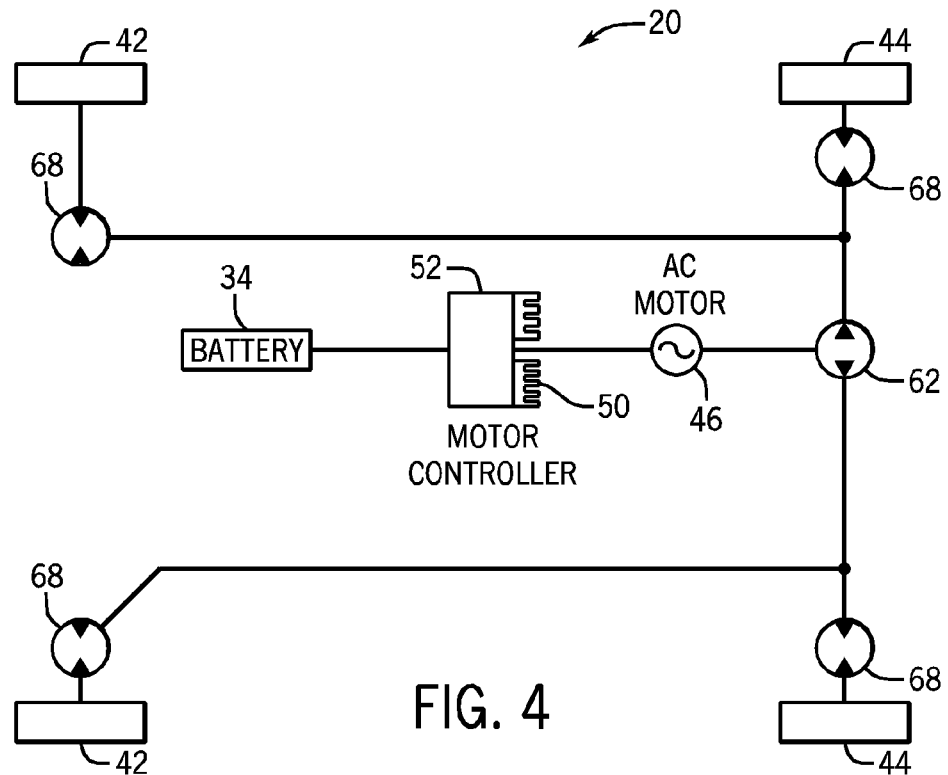
FIG. 4 is a schematic block diagram of an all-electric powered ANFO vehicle including a hydrostatic drive system.
Figure 5:
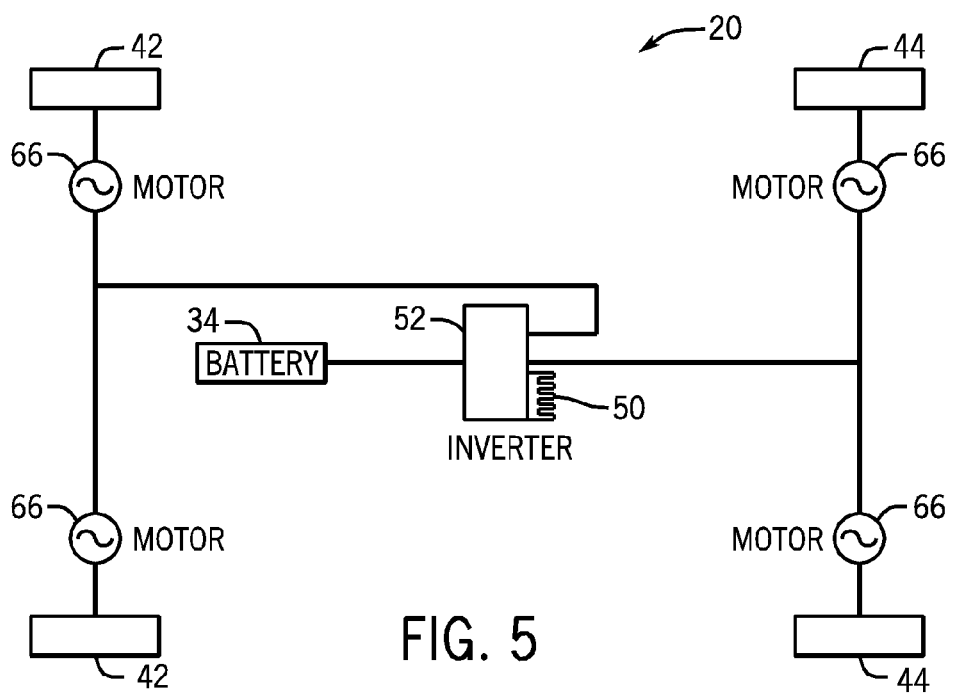
FIG. 5 is a schematic block diagram of an all-electric powered ANFO vehicle including an electric motor coupled to each wheel of each wheel set.
Figure 7:
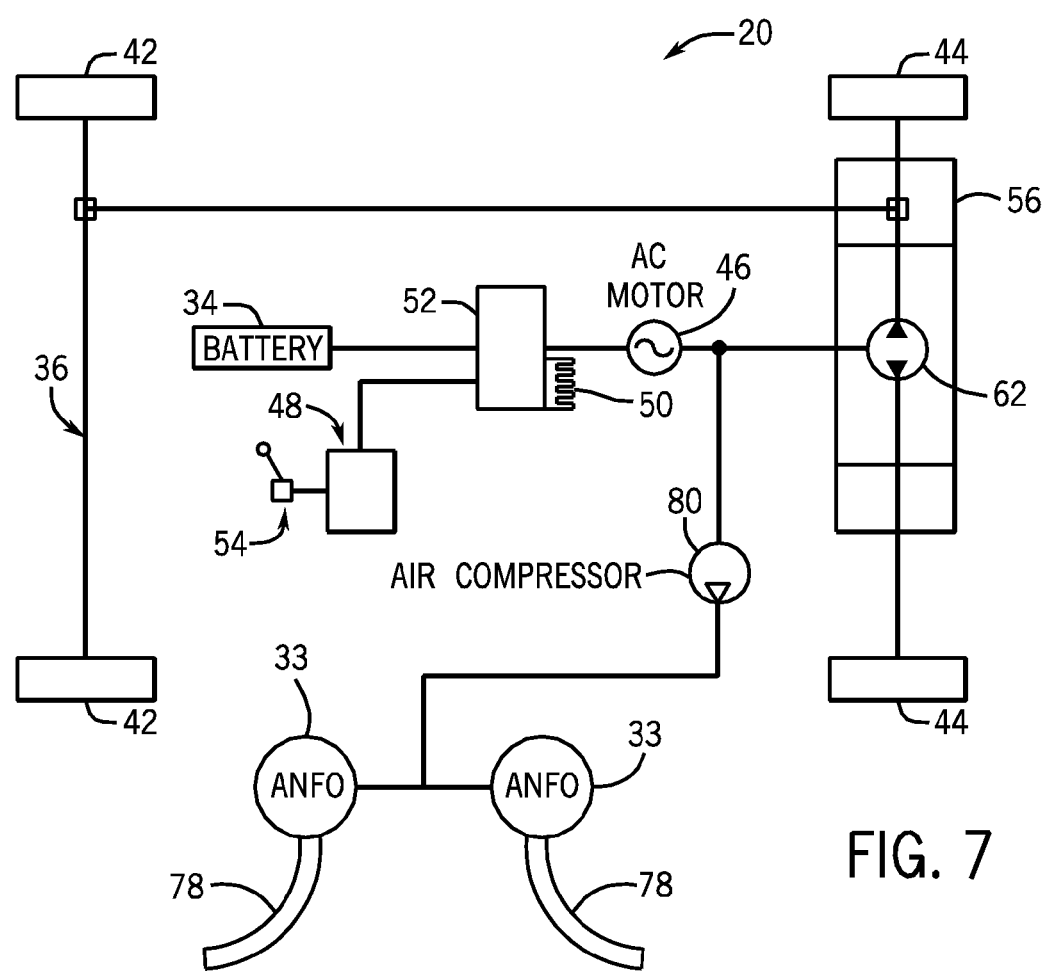
FIG. 7 is a schematic diagram of an exemplary embodiment of an all-electric ANFO vehicle including two containers of explosive components and associated equipment.

The all-electric powered ANFO vehicle 20 is powered by an AC induction motor 46 which is mounted on a support structure 22 and coupled to at least one wheel and the battery module 34. As illustrated in FIGS. 1,2, and 4, the AC induction motor 46 is coupled to the support structure 22 typically at the front 26 of the vehicle 20. In one embodiment, the AC induction motor 46 is a 150 hp continuous duty rated AC induction motor. The motor is capable of delivering a range of power for 30 minutes, however, larger or smaller motor options are typically available depending on the use conditions. It should be understood that the electrical and mechanical ratings of the AC motor 46 can be suitable for a particular application and venue. The AC motor drives a force transfer apparatus 56. FIGS. 4, 5, and 7 illustrate a schematic block diagram of an exemplary embodiment of an all-electric powered ANFO vehicle 20.

The electrical energy for the all-electric powered ANFO vehicle 20 is supplied by a battery module 34 which is replaceable. As illustrated in FIGS. 1 and 2, in one embodiment of the all-electric powered ANFO vehicle 20 the battery module 34 is coupled to the front of the support structure 22 that constitutes the first section 26. The replaceable battery pack module 34, in one embodiment is a series of absorbed glass mat batteries. However, a lead acid battery or lithium ion battery can be used to power the vehicle 20. In operation, the self-contained battery module 34 is removable for charging. The fully charged battery module can be installed in the vehicle 20 to replace a depleted battery module so that the vehicle can continue in its designated operations. It is also contemplated that the battery module 34 can be recharged while it is installed on the vehicle, as well as by a regenerative operation described below.

Figure 6:
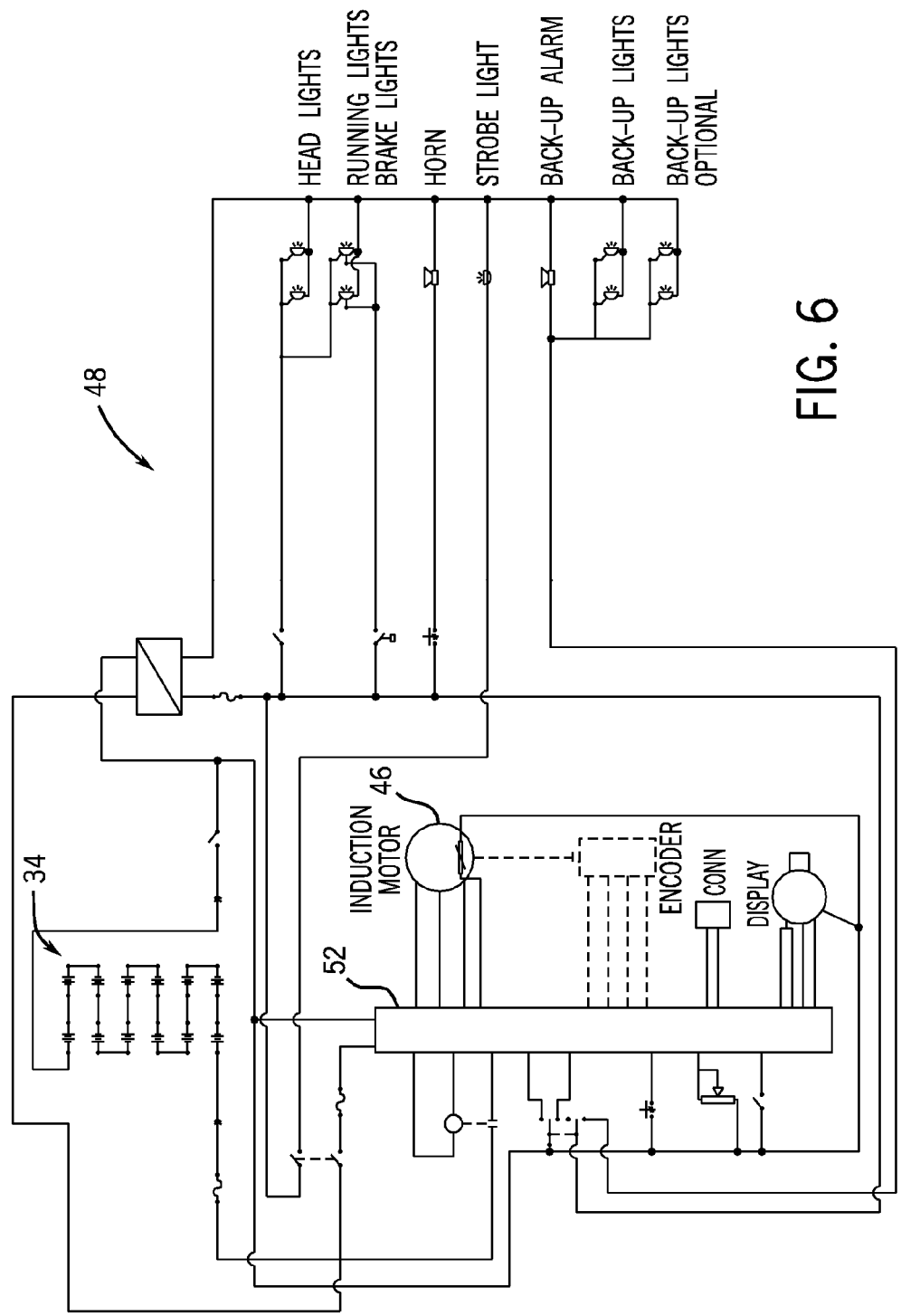
FIG. 6 is a schematic diagram of an exemplary embodiment of a vehicle controller including a motor control for the vehicle illustrated in FIG. 1.

The all-electric powered ANFO vehicle 20 includes a motor controller 48 having a DC/AC inverter 52 coupled to the AC induction motor 46 and the battery module 34. See FIG. 6 which illustrates an embodiment of a configuration of the power system for the vehicle 20. FIG. 6 includes a schematic diagram of an exemplary embodiment of a vehicle controller 54 including a motor control for the vehicle 20. The motor controller 48 in conjunction with the vehicle controller 54 controls and operates the various functions on the all-electric powered ANFO vehicle 20.

The battery module 34 typically is a 240-volt DC configuration that through the DC to AC inverter 52 delivers 170 volts AC to the induction motor 46. The battery module 34 can also be configured to provide a voltage in the range of 48 to 240 volts DC and approximately 400-2500 Ahr. depending on the required horsepower for the vehicle as determined by the user or manufacturer.

Various sensors, such as a speed bearing sensor or encoder may be coupled to the AC motor to provide speed references back to the motor controller 48 to operate the vehicle 20 as needed. The vehicle controller 54 typically includes digital graphic displays that indicate battery life remaining, speed of the vehicle, and other related information useful to an operator, as well as steering and throttle controls.

Because of the heat generated by the conversion of DC electrical energy to AC electrical energy in the inverter 52, a heat sink 50 may be mounted directly on the motor controller 48. In one embodiment the motor controller is mounted on the motor 46 side of the firewall and the heat sink is coupled to the motor controller 48, but positioned on the driver side of the firewall. In another embodiment, the motor controller 48 is mounted on the driver side of the firewall and the heat sink 50 is on the motor side of the firewall, but directly coupled to the motor controller. The motor controller 48 and heat sink 50 are coupled to the vehicle 20 at a convenient location, for example, on either side of the dash board which separates the operator position from the induction motor 46 location. The motor controller 48 and the mounted heat sink 50 can be mounted at any other convenient and appropriate location on the vehicle 20.

As illustrated in FIGS. 4, 5, and 7 various drive configurations can be implemented in the disclosed all-electric vehicle 20. FIG. 4 illustrates a schematic block diagram of an all-electric powered ANFO vehicle 20 including a hydrostatic drive system including a hydraulic pump 62 coupled to the AC induction motor 46. The hydraulic pump 62 powers individual hydraulic motors 68 coupled to each wheel 42, 44 of the wheel sets 36, 38 of the vehicle 20. Appropriate conduit and valving trains are utilized to control the movement of the vehicle, for example in either two or four wheel drive configurations.

FIG. 5 illustrates a schematic block diagram of an all-electric powered ANFO vehicle 20 including an electric motor 66 coupled to each wheel 42, 44 of each wheel set 36, 38. Each of the electric motors 66, through appropriate control wiring, provides selected power to each wheel, for example providing two and four wheel drive capability for the all-electric vehicle 20.

An all-electric powered ANFO vehicle 20 including a power system including a hydrostatic drive composed of hydraulic pump and motor set and a mechanical force transfer system including a force transfer apparatus configured for full-time rear wheel drive and front wheel-on-demand drive is also contemplated. The hydraulic pump motor set includes a hydraulic pump 62 and a hydraulic motor. With the hydraulic motor coupled to an appropriate gear box 56 coupled to the wheel set 44 of the wheel set. A selective control of either the rear wheel drive or front wheel-on-demand drive is controlled through the vehicle controller 54 selected by the operator of the vehicle 20.

One of the advantages of the disclosed all-electric powered ANFO vehicle 20 is it is reconfigurable for different operations and capabilities with the support structure 22 including a portion 30 configured as a tool platform 31. The all-electric vehicle 20, is suitable for operation in and about mine sites, including underground operations.

The all-electric vehicle 20 is also suitable for operation in and around construction sites. The tool platform is configured to couple with a tool module.

The platform of the ANFO vehicle 20 includes one or more containers 33. (See FIG. 7). Each container 33 holds explosive components, for example ammonium nitrate and fuel oil. When the ANFO vehicle arrives at a mine face, an air compressor 80 powered by the AC motor 46 pumps the explosive components, through conduits 78 into pre-drilled holes in the mine face. Appropriate detonators are installed to control the explosion used to extract the mine ore. The size of the conduits and air compressor are determined by the user of the disclosed ANFO vehicle for a given application.

FIGS. 1 and 3 illustrate the vehicle 20 with the platform 31 configured with a lift apparatus 32. The lift apparatus 32 includes a personnel carrier so that an operator can be lifting to a selected height as determined by the operator. Appropriate actuators, for example electric motors or hydraulic cylinders and pumps are used to articulate the lift apparatus 32.

The all-electric vehicle 20 may also be configured with the battery module 34 configured to receive and store electrical power regenerated through the inverter 52 by the AC induction motor 46 functioning as a generator to dissipate mechanical energy from the wheels 42, 44 in order to provide a braking function to the vehicle. The regenerative braking function of the vehicle, in addition to controlling the deceleration of the vehicle, can also be configured to recharge the batteries in the battery module 34. For example if the vehicle 20 is moving in a down-hill aspect as is typically found in mining venues the operator of the vehicle 20 can utilize the AC induction motor 46 to slow the vehicle. In one arrangement, the operator switches the AC induction motor 46 from an electric motor to an electric generator with the electric motor 46 being turned by the motion of the vehicle wheels 42, 44 rotating the electric motor through appropriate couplings. Such configuration slows the vehicle 20 down and also regenerates the battery module 34. Another advantage of the regeneration system is less wear and tear on the vehicle brakes and less brake dust expelled into the mine facility.

One advantage of the all-electric powered ANFO vehicle 20 of the present disclosure is that it is emission free and generates no exhaust as is typically found in diesel-powered mining vehicles. The AC induction motor 46 provides high torque at a reasonable rpm without the need to rev up and emit large amounts of exhaust as is typical in a diesel-powered ANFO vehicle. The DC/AC inverter 52 provides the induction motor 46 with the proper voltage and frequency to achieve a desired speed. Since the AC induction motor has no brushes, there is no carbon deterioration or carbon issues as is typical with a DC electric motor.

The preferred battery module 34 is one that includes the absorbed glass mat-type battery since such battery is classified as "non-spillable" and can be shipped as non-hazardous material. Further such absorbed glass mat batteries are maintenance free. It should be understood, not withstanding the above, that other types of batteries can be used with this vehicle as determined by a user for a specific application. Such battery types include, Lithium-Ion, Sodium-Ion, Nickel metal hydride, and flooded lead acid. The battery size, i.e. cell number, is dependent upon performance specifications established by the user of the disclosed ANFO vehicle.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present disclosure has been shown and described with reference to particular embodiments and applications thereof, it has been presented for purposes of illustration and description and is not intended to be exhaustive or to limit the vehicle to the particular embodiments and applications disclosed. It will be apparent to those having ordinary skill in the art that a number of changes, modifications, variations, or alterations to the vehicle as described herein may be made, none of which depart from the spirit or scope of the present disclosure. The particular embodiments and applications were chosen and described to provide the best illustration of the principles of the vehicle and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. An all-electric powered ANFO vehicle comprising:
a support structure including a first section and second section dimensionally configured to operate in an underground mine;
a platform located on the second section of the support structure;
a first container including an explosive component mounted to a first location on the platform;
a second container including an explosive component mounted to a second location on the platform, the second location being a location separate from the first location;
a self-contained battery module removably mounted on the support structure;
a pair of wheel sets coupled to the support structure, with each wheel set including two wheels, with one wheel of each wheel set rotatably coupled on each side of the support structure;
a lift apparatus extending upwards above the top surface of the platform, the lift apparatus having a first end and a second end, the first end coupled to the second section of the support structure, the second end of the lift apparatus attached to a personnel carrier configured to support a human above the top surface of the platform, the lift apparatus further including conduits in fluid communication with the containers;
an AC induction motor mounted on the support structure and coupled to at least one wheel and the battery module;
a motor controller including a DC/AC inverter coupled to the AC induction motor and the battery module; and
a vehicle controller coupled to the motor controller.

2. The all-electric vehicle of claim 1, including a heat sink mounted on the motor controller.

3. The all-electric vehicle of claim 1, further comprising another AC induction motor mounted on the support structure and coupled to another wheel and the battery module.

4. The all-electric vehicle of claim 1, wherein the first section and the second section of the support structure are connected with a steering section configured to move the first section angularly relative to the second section.

5. The all-electric vehicle of claim 4, wherein the steering section includes two hydraulic cylinders with one end of each hydraulic cylinder coupled to a common pivot configured on the first section or the second section.

6. An all-electric powered ANFO vehicle comprising:
a support structure including a platform, with the support structure dimensionally configured to move within an underground mine;
a first container including an explosive component mounted to a first location on the platform;
a second container including an explosive component mounted to a second location on the platform, the second location being a location separate from the first location;
a self-contained battery module removably mounted on the front of the support structure;
a pair of wheel sets coupled to the support structure, with each wheel set including two wheels, with one wheel of each wheel set rotably coupled on each side of the support structure;
a lift apparatus configured to support a human, the lift apparatus extending upward from the top surface of the platform, the lift apparatus configured to lift a human to a predetermined height and including conduits in fluid communication with the containers supported on the platform;
a pair of motors mounted on the support structure and coupled to the battery module with a motor operably coupled to each wheel of at least one wheel set;
a motor controller including a DC/AC inverter coupled to each motor and the battery module; and
a speed bearing sensor coupled to the pair of motors, the speed bearing sensor configured to provide speed references to the motor controller.

7. The all-electric powered ANFO vehicle of claim 6, wherein the motor coupled to each wheel is an electric motor or a hydraulic motor.

8. The all-electric powered ANFO vehicle of claim 6, including a heat sink mounted on the motor controller.

9. The all-electric vehicle of claim 6, wherein the support structure comprises a first section and a second section with the two sections connected with a steering section configured to move the first section angularly relative to the second section.

10. The all-electric vehicle of claim 9, wherein the steering section includes two hydraulic cylinders with one end of each hydraulic cylinder coupled to a common pivot configured on the first section or the second section.

11. The all-electric vehicle of claim 9, wherein the second section includes the platform.

12. The all-electric vehicle of claim 6, including at least one additional motor mounted to the support structure, with the additional motor coupled to at least one wheel of another wheel set.

13. An all-electric powered ANFO vehicle comprising:
a support structure dimensionally configured to operate in an underground mine, the support structure including a first section and a second section with the two sections connected with a steering section configured to move the first section angularly relative to the second section;
the second section of the support structure configured as a platform;
a first container including an explosive component mounted to a first location on the platform;
a second container including an explosive component mounted to a second location on the platform, the second location being a location separate from the first location;
a self-contained battery module removably mounted on the support structure;
a pair of wheel sets coupled to the support structure, with each wheel set including two wheels, with one wheel of each wheel set rotatably coupled on each side of the support structure;
a lift apparatus configured to support a human, the lift apparatus attached to the platform and including conduits in fluid communication with the containers, the lift apparatus configured to lift the user to a predetermined position above the top surface of the platform;
a pair of motors mounted on the support structure and coupled to the battery module with a motor operably coupled to each wheel of at least one wheel set;

a motor controller including a DC/AC inverter coupled to the motor and the battery module; and a vehicle controller coupled to the motor controller.

14. The all-electric vehicle of claim 13, wherein the steering section includes two hydraulic cylinders with one end of each hydraulic cylinder coupled to a common pivot configured on the first section or the second section.

15. The all-electric vehicle of claim 13, including a heat sink mounted On the motor controller.

16. The all-electric vehicle of claim 13, further comprising another AC induction motor mounted on the support structure and coupled to another wheel and the battery module;

wherein the another AC induction motor is configured to function as a generator to dissipate mechanical energy from the another wheel to provide braking function to the vehicle and to recharge the battery module.

17. The all-electric powered ANFO vehicle of claim 13, wherein the motor coupled to each wheel is an electric motor or a hydraulic motor.

18. The all-electric vehicle of claim 13, including at least one additional motor mounted to the support structure, with the additional motor coupled to at least one wheel of another wheel set.

19. The all-electric vehicle of claim 13, further comprising another container including another explosive component, with such container mounted on the platform.

20. The all-electric vehicle of claim 18, further including a second pair of motors mounted on the support structure and coupled to the battery module, each of the motors of the first and second pair of motors operably coupled to a separate wheel.

* * * * *